(12) United States Patent
Arai et al.

(10) Patent No.: US 11,746,225 B2
(45) Date of Patent: Sep. 5, 2023

(54) RESIN COMPOSITION, THERMOPLASTIC RESIN COMPOSITION, AND THERMOPLASTIC RESIN MOLDING

(71) Applicant: NOF CORPORATION, Tokyo (JP)

(72) Inventors: Hiroki Arai, Chita-gun (JP); Kazuaki Mima, Chita-gun (JP)

(73) Assignee: NOF CORPORATION, Tokyo (JP)

(*) Notice: Subject to any disclaimer, the term of this patent is extended or adjusted under 35 U.S.C. 154(b) by 124 days.

(21) Appl. No.: 17/422,997

(22) PCT Filed: Feb. 5, 2020

(86) PCT No.: PCT/JP2020/004355
§ 371 (c)(1),
(2) Date: Jul. 14, 2021

(87) PCT Pub. No.: WO2020/162494
PCT Pub. Date: Aug. 13, 2020

(65) Prior Publication Data
US 2022/0098397 A1 Mar. 31, 2022

(30) Foreign Application Priority Data
Feb. 7, 2019 (JP) .................................. 2019-020448

(51) Int. Cl.
*C08L 33/08* (2006.01)
*C08L 9/06* (2006.01)
*C08L 69/00* (2006.01)

(52) U.S. Cl.
CPC ............... *C08L 33/08* (2013.01); *C08L 9/06* (2013.01); *C08L 69/00* (2013.01); *C08L 2205/035* (2013.01)

(58) Field of Classification Search
CPC .. C08L 33/08; C08L 9/06; C08L 69/00; C08L 2205/035; C08L 23/0869; C08L 53/025; C08L 51/003; C08F 255/02; C08F 212/08; C08F 220/44; C08F 222/06; C08F 220/1812; C08F 220/1804; C08F 220/282

See application file for complete search history.

(56) References Cited

U.S. PATENT DOCUMENTS 6,512,027 B2 * 1/2003 Kanai ..................... C08L 51/06
523/522
2017/0321052 A1 11/2017 Moriyasu et al.

FOREIGN PATENT DOCUMENTS

| CN | 106366545 A | * | 2/2017 |
| JP | 62-243643 A | | 10/1987 |
| JP | 2015-131951 A | | 7/2015 |
| JP | 2017-014447 A | | 1/2017 |
| WO | 2020/004383 A1 | | 1/2020 |

OTHER PUBLICATIONS

International Preliminary Report on Patentability with translation of Written Opinion dated Aug. 10, 2021, in application No. PCT/JP2020/004355.
International Search Report for PCT/JP2020/004355 dated Apr. 28, 2020 (PCT/ISA/210).
Communication dated May 11, 2023 issued by the Japanese Patent Office in application No. 2020-571234.

* cited by examiner

*Primary Examiner* — Marc S Zimmer
*Assistant Examiner* — Surbhi M Du
(74) *Attorney, Agent, or Firm* — Sughrue Mion, PLLC

(57) ABSTRACT

Disclosed herein is a resin composition including an ethylene-acrylic acid alkyl ester copolymer (L), a graft copolymer (M), and a styrene-based elastomer (N), wherein the graft copolymer (M) is obtained by a reaction among an ethylene-acrylic acid alkyl ester copolymer (A), a monomer component (B) containing at last one monomer selected from the group consisting of a (meth)acrylic acid alkyl ester monomer and an aromatic vinyl monomer, and t-butyl peroxymethacryloyloxyethyl carbonate (C), and a weight ratio between the ethylene-acrylic acid alkyl ester copolymer (A) and the monomer component (B) ((A)/(B)) is 50/50 to 98/2. The resin composition is capable of reducing squeaking noises generated by contact between a thermoplastic resin molded body and leather.

6 Claims, No Drawings

RESIN COMPOSITION, THERMOPLASTIC RESIN COMPOSITION, AND THERMOPLASTIC RESIN MOLDING

CROSS REFERENCE TO RELATED APPLICATIONS

This application is a National Stage of International Application No. PCT/JP2020/004355 filed Feb. 5, 2020, claiming priority based on Japanese Patent Application No. 2019-020448 filed Feb. 7, 2019.

TECHNICAL FIELD

The present invention relates to a resin composition, a thermoplastic resin composition, and a resin molded body obtained from the composition.

BACKGROUND ART

Thermoplastic resins are excellent in impact resistance, workability, dimensional stability, and mechanical properties, and are therefore used in a wide range of fields such as housings of electric and electronic devices, interior and exterior parts of automobiles, building materials, furniture, musical instruments, and sundries. Further, extrusion molded articles (molded bodies) are widely used as various display devices and protective parts in the interior of automobiles by being subjected to additional secondary processing such as coating, lamination, or surface decoration.

Among thermoplastic resins, PC (polycarbonate) resin, ABS resin, ASA resin, and a mixed resin of two of them (hereinafter also referred to as PC/ABS resin or PC/ASA resin) are excellent also in flame retardancy, and are therefore required to have silent properties such that squeaking noises generated by contact between resins of various members can be reduced (suppressed) as their ranges of use increase.

As a method for improving the silent properties (effect of suppressing squeaking noises) of PC/ABS resin, Patent Document 1 discloses a PC/ABS resin composition containing an olefin-based graft copolymer.

PRIOR ART DOCUMENT

Patent Document

Patent Document 1: JP-A-2017-14447

SUMMARY OF THE INVENTION

Problems to be Solved by the Invention

In recent years, as silent properties (effect of suppressing squeaking noises), not only a reduction (suppression) of squeaking noises generated by contact between resins but also a reduction (suppression) of squeaking noises generated by contact between resin and leather (artificial leather (soft vinyl chloride) or natural leather) is further required. However, it has been revealed that a resin molded body obtained from the PC/ABS resin composition disclosed in Patent Document 1 can reduce (suppress) squeaking noises generated by contact between resins, but leaves room for improvement in reducing (suppressing) squeaking noises generated by contact between resin and leather.

In view of such circumstances, it is an object of the present invention to provide a resin composition capable of reducing (suppressing) squeaking noises generated by contact between a thermoplastic resin molded body and leather (a resin composition having silent properties).

Means for Solving the Problems

Specifically, the present invention relates to a resin composition including an ethylene-acrylic acid alkyl ester copolymer (L), a graft copolymer (M), and a styrene-based elastomer (N), wherein the graft copolymer (M) is obtained by a reaction among an ethylene-acrylic acid alkyl ester copolymer (A), a monomer component (B) containing at least one monomer selected from the group consisting of a (meth)acrylic acid alkyl ester monomer and an aromatic vinyl monomer, and t-butyl peroxymethacryloyloxyethyl carbonate (C), and a weight ratio between the ethylene-acrylic acid alkyl ester copolymer (A) and the monomer component (B) ((A)/(B)) is 50/50 to 98/2.

The present invention also relates to a thermoplastic resin composition including the resin composition and a thermoplastic resin (X), wherein the thermoplastic resin (X) is at least one selected from the group consisting of a polycarbonate resin and a resin containing, as structural units, a rubber-based polymer, a vinyl cyanide-based monomer, and an aromatic vinyl-based monomer.

The present invention also relates to a thermoplastic resin molded body obtained from the thermoplastic resin composition.

Effect of the Invention

The details of action mechanism of the effect of the resin composition according to the present invention are not completely known, but are estimated as follows. It is to be noted that the present invention should not be interpreted based on only this action mechanism.

The resin composition according to the present invention contains an ethylene-acrylic acid alkyl ester copolymer (L), a graft copolymer (M), and a styrene-based elastomer (N). In the resin composition, the graft copolymer (M) has a weight ratio between an ethylene-acrylic acid alkyl ester copolymer (A) and a monomer component (B) ((A)/(B)) of 50/50 to 98/2, which improves compatibility among the ethylene-acrylic acid alkyl ester copolymer (L), the styrene-based elastomer (N), and a thermoplastic resin (X) so that the ethylene-acrylic acid alkyl ester copolymer (L) is well dispersed. Therefore, the resin composition according to the present invention can well be dispersed in the thermoplastic resin (X), which makes it possible for a molded body of a thermoplastic resin composition obtained by adding the resin composition to the thermoplastic resin (X) (thermoplastic resin molded body) to reduce (suppress) squeaking noises generated by contact between the molded body and leather.

MODE FOR CARRYING OUT THE INVENTION

A resin composition according to the present invention contains an ethylene-acrylic acid alkyl ester copolymer (L), a graft copolymer (M), and a styrene-based elastomer (N).

<Ethylene-Acrylic Acid Alkyl Ester Copolymer (L)>

An ethylene-acrylic acid alkyl ester copolymer (L) used in the present invention is synthesized from ethylene and a (meth)alkyl ester monomer. Such ethylene-acrylic acid alkyl ester copolymers (L) may be used singly or in combination of two or more of them.

The type of the (meth)acrylic acid alkyl ester monomer used for the ethylene-acrylic acid alkyl ester copolymer (L) is not particularly limited as long as the (meth)acrylic acid alkyl ester monomer is a (meth)acrylate having an alkyl group at the end of its molecule.

Examples of the (meth)acrylic acid alkyl ester monomer include methyl acrylate, ethyl acrylate, butyl acrylate, methyl methacrylate, ethyl methacrylate, and butyl methacrylate. These (meth)acrylic acid alkyl ester monomers may be used singly or in combination of two or more of them.

The ethylene-acrylic acid alkyl ester copolymer (L) may use another monomer, if necessary. Examples of the other monomer include saturated carboxylic acid vinyl esters such as vinyl acetate, vinyl propionate, and vinyl butyrate. These other monomers may be used singly or in combination of two or more of them.

The ratio (content) of a structural unit derived from the alkyl ester monomer in the ethylene-acrylic acid alkyl ester copolymer (L) is preferably 2 wt % or more, more preferably 5 wt % or more from the viewpoint of improving compatibility with the graft copolymer (M), and is preferably 40 wt % or less, more preferably 35 wt % or less from the viewpoint of improving the silent properties (effect of suppressing squeaking noises) of a thermoplastic resin molded body. The content of the alkyl ester monomer is determined from, for example, a calibration curve obtained by measuring the absorbance at 1039 $cm^{-1}$ of reference samples, whose alkyl ester monomer concentrations have previously been determined by nuclear magnetic resonance, by infrared absorption spectroscopy.

The total ratio of a structural unit derived from ethylene and a structural unit derived from the (meth)acrylic acid alkyl ester monomer in the ethylene-acrylic acid alkyl ester copolymer (L) is preferably 70 wt % or more, more preferably 80 wt % or more, even more preferably 90 wt % or more, even more preferably 95 wt % or more.

From the viewpoint of improving workability in the production process of the resin composition, the melt mass-flow rate (hereinafter also referred to as MFR) of the ethylene-acrylic acid alkyl ester copolymer (L) is preferably 0.2 to 40 (g/10 min), more preferably 0.4 to 30 (g/10 min). It is to be noted that the MFR can be measured in accordance with JIS K6924-1 (1997).

Examples of a commercially-available product of the ethylene-acrylic acid alkyl ester copolymer (L) include "REXPEARL A6200", "REXPEARL A4250", and "REXPEARL A3100" manufactured by Japan Polyethylene Corporation.

<Graft Copolymer (M)>

The graft copolymer (M) is obtained by a reaction among (has as structural units) an ethylene-acrylic acid alkyl ester copolymer (A), a monomer component (B) containing at least one monomer selected from the group consisting of a (meth)acrylic acid alkyl ester monomer and an aromatic vinyl monomer, and t-butyl peroxymethacryloyloxyethyl carbonate (C).

The ethylene-acrylic acid alkyl ester copolymer (A) is synthesized from ethylene and a (meth)alkyl ester monomer. As the ethylene-acrylic acid alkyl ester copolymer (A), the above-described ethylene-acrylic acid alkyl ester copolymer (L) can be used. Such ethylene-acrylic acid alkyl ester copolymers (A) may be used singly or in combination of two or more of them.

The monomer component (B) contains at least one monomer selected from the group consisting of a (meth)acrylic acid alkyl ester monomer and an aromatic vinyl monomer.

An example of the (meth)acrylic acid alkyl ester monomer is a linear or branched alkyl (meth)acrylate whose alkyl group has 1 to 18 carbon atoms. The number of carbon atoms is preferably 1 to 6, more preferably 1 to 3. Examples of the (meth)acrylic acid alkyl ester monomer include methyl acrylate, ethyl acrylate, butyl acrylate, propyl acrylate, hexyl acrylate, 2-ethylhexyl acrylate, methyl methacrylate, ethyl methacrylate, butyl methacrylate, propyl methacrylate, hexyl methacrylate, 2-ethylhexyl methacrylate, and lauryl methacrylate. Among them, from the viewpoint of improving the dispersibility of the ethylene-acrylic acid alkyl ester copolymer (L), methyl acrylate, ethyl acrylate, butyl acrylate, methyl methacrylate, ethyl methacrylate, and butyl methacrylate are preferred. These (meth)acrylic acid alkyl ester monomers may be used singly or in combination of two or more of them.

Examples of the aromatic vinyl monomer include styrene, α-methyl styrene, o-methyl styrene, m-methyl styrene, p-methyl styrene, and p-t-butyl styrene. Among them, styrene and α-methyl styrene are preferred. These aromatic vinyl monomers may be used singly or in combination of two or more of them.

From the viewpoint of improving the dispersibility of the ethylene-acrylic acid alkyl ester copolymer (L), the monomer component (B) may further contain at least one monomer selected from the group consisting of a (meth)acrylonitrile monomer and a (meth)acrylic acid hydroxyalkyl ester monomer.

Examples of the (meth)acrylonitrile monomer include acrylonitrile and methacrylonitrile. Among them, acrylonitrile is preferred. These (meth)acrylonitrile monomers may be used singly or in combination of two or more of them.

Examples of the (meth)acrylic acid hydroxyalkyl ester monomer include 2-hydroxyethyl methacrylate, 2-hydroxypropyl methacrylate, 2,3-dihydroxypropyl methacrylate, 2-hydroxyethyl acrylate, 4-hydroxybutyl acrylate, and hydroxybenzyl methacrylate. Among them, from the viewpoint of improving the dispersibility of the ethylene-acrylic acid alkyl ester copolymer (L), 2-hydroxyethyl methacrylate and 2-hydroxypropyl methacrylate are preferred. These (meth)acrylic acid hydroxyalkyl ester monomers may be used singly or in combination of two or more of them.

The monomer component (B) may use another monomer other than the above-described monomers. Examples of the other monomer include: amide group-containing monomers such as (meth)acrylamide and N,N-dimethyl (meth)acrylamide; carboxyl group-containing monomers such as (meth)acrylic acid; epoxy group-containing monomers such as glycidyl (meth)acrylates; and glycol-based monomers such as polyethylene glycol (meth)acrylate and polypropylene glycol (meth)acrylate. These other monomers may be used singly or in combination of two or more of them.

The ratio of at least one monomer selected from the group consisting of the (meth)acrylic acid alkyl ester monomer and the aromatic vinyl monomer in the monomer component (B) is preferably 50 wt % or more, more preferably 60 wt % or more.

When at least one monomer selected from the group consisting of the (meth)acrylonitrile monomer and the (meth)acrylic acid hydroxyalkyl ester monomer is used as the monomer component (B), the ratio of at least one monomer selected from the group consisting of the (meth)acrylonitrile monomer and the (meth)acrylic acid hydroxyalkyl ester monomer in the monomer component (B) is preferably 50 wt % or less, more preferably 40 wt % or less.

The total ratio of at least one monomer selected from the group consisting of the (meth)acrylic acid alkyl ester monomer and the aromatic vinyl monomer and at least one monomer selected from the group consisting of the (meth)acrylonitrile monomer and the (meth)acrylic acid hydroxyalkyl ester monomer in the monomer component (B) is preferably 70 wt % or more, more preferably 80 wt % or more, even more preferably 90 wt % or more, even more preferably 95 wt % or more.

A more preferred combination of the monomers of the monomer component (B) is a combination of butyl acrylate (b-1) and methyl methacrylate (b-2), a combination of styrene (b-3) and (meth)acrylonitrile (b-4) or, a combination of butyl acrylate (b-1), styrene (b-3), and 2-hydroxypropyl methacrylate (b-5). In this case, from the viewpoint of improving the silent properties (effect of suppressing squeaking noises) of a resin molded body, the weight ratio between butyl acrylate (b-1) and methyl methacrylate (b-2) ((b-1)/(b-2)) or the weight ratio between styrene (b-3) and (meth)acrylonitrile (b-4) ((b-3)/(b-4)) is preferably 50/50 to 90/10, more preferably 60/40 to 80/20. Further, in the case of the combination of butyl acrylate (b-1), styrene (b-3), and 2-hydroxypropyl methacrylate (b-5), the ratio of butyl acrylate (b-1) is preferably 10 to 40 wt %, the ratio of styrene (b-3) is preferably 10 to 40 wt %, and the ratio of 2-hydroxypropyl methacrylate (b-5) is preferably 10 to 40 wt % with respect to the total weight of butyl acrylate (b-1), styrene (b-3), and 2-hydroxypropyl methacrylate (b-5).

The weight ratio between the ethylene-acrylic acid alkyl ester copolymer (A) and the monomer component (B) ((A)/(B)) is 50/50 to 98/2. From the viewpoint of improving the scratch resistance and silent properties (effect of suppressing squeaking noises) of a resin molded body, the weight ratio ((A)/(B)) is preferably 60/40 to 95/5, more preferably 70/30 to 90/10.

The t-butyl peroxymethacryloyloxyethyl carbonate (C) is a compound (MEC) represented by the following general formula (1).

[Formula 1]

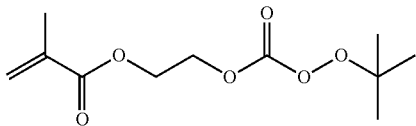

(1)

The graft copolymer (M) is produced by a polymerization method using the t-butyl peroxymethacryloyloxyethyl carbonate (C) (radical polymerizable organic peroxide).

The polymerization method using a radical polymerizable organic peroxide is a method including a step in which the ethylene-acrylic acid alkyl ester copolymer (A) (particles of the ethylene-acrylic acid alkyl ester copolymer (A)) is impregnated with the monomer component (B), the t-butyl peroxymethacryloyloxyethyl carbonate (C), and a polymerization initiator by adding the monomer component (B), the t-butyl peroxymethacryloyloxyethyl carbonate (C), and the polymerization initiator to a suspension obtained by suspending the ethylene-acrylic acid alkyl ester copolymer (A) in a medium mainly containing water (ethylene-acrylic acid alkyl ester copolymer (A) concentration: 10 to 30 parts by weight) to obtain a precursor by polymerization of the monomer component (B) and a step in which the precursor is melted and kneaded (melt kneaded) to produce a graft copolymer (M). It is to be noted that when the ethylene-acrylic acid alkyl ester copolymer (A) is suspended, a suspension agent (e.g., polyvinyl alcohol) may be used in an amount of about 0.1 to 1 part by weight per 100 parts by weight of the ethylene-acrylic acid alkyl ester copolymer (A), if necessary. Further, during the impregnation, the suspension may be stirred and heated (e.g., at about 60 to 80° C.) to sufficiently impregnate the ethylene-acrylic acid alkyl ester copolymer (A) with the monomer component (B), etc.

The polymerization initiator is not particularly limited as long as radicals are generated by heat, and examples of such a polymerization initiator include organic peroxides and azo-based polymerization initiators. These polymerization initiators may be used singly or in combination of two or more of them.

From the viewpoint of preventing rapid decomposition of the polymerization initiator to prevent the polymerization initiator and the monomer component from remaining, the 10-hr half-life temperature (hereinafter also referred to as T10) of the polymerization initiator is preferably 40° C. or higher, more preferably 50° C. or higher and is preferably 130° C. or lower, more preferably 100° C. or lower, even more preferably 80° C. or lower. It is to be noted that the 10-hr half-life temperature (T10) refers to a temperature at which, when a solution obtained by dissolving the polymerization initiator in benzene at, for example, 0.05 to 0.1 mol/L is thermally decomposed, the half-life of the polymerization initiator is 10 hours.

Examples of the polymerization initiator include: organic peroxides such as t-butyl peroxyneoheptanoate (T10=51° C.), t-hexyl peroxypivalate (T10=53° C.), t-butyl peroxypivalate (T10=55° C.), di(3,5,5-trimethylhexanoyl) peroxide (T10=59° C.), dilauroyl peroxide (T10=62° C.), 1,1,3,3,-tetramethylbutyl peroxy-2-ethylhexanoate (T10=65° C.), 2,5-dimethyl-2,5-di(2-ethylhexanoylperoxy)hexane (T10=66° C.), t-hexyl peroxy-2-ethylhexylhexanoate (T10=70° C.), di(4-methylbenzoyl) peroxide (T10=71° C.), t-butyl peroxy-2-ethylhexanote (T10=72° C.), benzoyl peroxide (T10=74° C.), t-hexyl peroxyisopropyl monocarbonate (T10=95° C.), t-butyl peroxy-3,5,5,-trimethylhexanoate (T10=97° C.), t-butyl peroxylaurate (T10=98° C.), t-butyl peroxyisopropyl monocarbonate (T10=99° C.), t-butyl peroxy-2-ethylhexyl monocarbonate (T10=99° C.), t-hexyl peroxybenzoate (T10=99° C.), 2,5-dimethyl-2,5-di(benzoylperoxy)hexane (T10=100° C.), t-butyl peroxyacetate (T10=102° C.), 2,2-di(t-butylperoxy)butane (T10=103° C.), t-butyl peroxybenzoate (T10=104° C.), n-butyl-4,4-di(t-butylperoxy)valerate (T10=105° C.), di(2-t-butylperoxyisopropyl)benzene (T10=119° C.), dicumyl peroxide (T10=116° C.), di-t-hexyl peroxide (T10=116° C.), 2,5-dimethyl-2,5-di(t-butylperoxy)hexane (T10=118° C.), t-butyl cumylperoxide (T10=120° C.), and di-t-butyl peroxide (T10=124° C.); and azo-based polymerization initiators such as 2,2-azobis(2,4-dimethylvaleronitrile) (T10=51° C.), 2,2-azobis(isobutyronitrile) (T10=65° C.), and 2,2-azobis(2-methylbutyronitrile) (T10=67° C.)

In the step of producing a precursor, the polymerization temperature depends on raw materials etc. (particularly depends on the 10-hr half-life temperature of the polymerization initiator) and therefore cannot definitely be determined. However, usually, the polymerization temperature is preferably 65° C. or higher, more preferably 70° C. or higher and is preferably 90° C. or lower, more preferably 85° C. or lower. Further, the polymerization time depends on raw materials, reaction temperature, etc. and therefore cannot definitely be determined. However, usually, the polymerization time is preferably 1.5 hours or longer, more preferably 2 hours or longer and is preferably 6 hours or shorter, more preferably 5 hours or shorter from the viewpoint of improving the yield of a desired product.

In the step of producing a precursor, the amount of the t-butyl peroxymethacryloyloxyethyl carbonate (C) is preferably 0.5 parts by weight or more, more preferably 1 part by weight or more, even more preferably 3 parts by weight or more and is preferably 10 parts by weight or less, more preferably 8 parts by weight or less, even more preferably 6 parts by weight or less per 100 parts by weight of the monomer component (B).

In the step of producing a precursor, the amount of the polymerization initiator is preferably 0.3 parts by weight or more, more preferably 0.5 parts by weight or more and is preferably 3 parts by weight or less, more preferably 2 parts by weight or less per 100 parts by weight of the monomer component (B).

The melt kneading of the precursor may be performed by, for example, a method using a kneading machine such as a Banbury mixer, a kneader, a kneading extruder, a twin-screw extruder, or a roll. The number of times of kneading may be either once or two or more times. The time of kneading depends on, for example, the size of a kneading machine to be used, but may usually be about 3 to 10 minutes. The discharge temperature of the kneading machine is preferably 130 to 350° C., more preferably 150 to 250° C.

<Styrene-Based Elastomer (N)>

The styrene-based elastomer (N) used in the present invention is a block copolymer containing a polymer block A mainly containing polystyrene and a polymer block B mainly containing a conjugated diene compound. Examples of the styrene-based elastomer (N) include a block copolymer having an A-B structure, a block copolymer having an A-B-A structure, a block copolymer having a B-A-B-A structure, and a block copolymer having an A-B-A-B-A structure. The styrene-based elastomer (N) preferably has two or more polymer blocks A in its molecule from the viewpoint of mechanical strength and molding processability. In the polymer block B, the mode of binding between the conjugated diene compounds is not particularly limited, and they may be bound together in any mode. When the molecule has two or more polymer blocks B, the polymer blocks B may have the same structure or different structures. Such styrene-based elastomers (N) may be used singly or in combination of two or more of them, In the styrene-based elastomer (N), the ratio of a structural unit derived from polystyrene is preferably 5 to 65 wt %, more preferably 10 to 60 wt % from the viewpoint of improving compatibility with a thermoplastic resin (X).

The hydrogenation ratio (the ratio of the number of bonds having been turned into C—C single bonds by hydrogenation with respect to the number of C—C double bonds in a block copolymer of polystyrene and a conjugated diene compound before hydrogenation) of the styrene-based elastomer (N) is not particularly limited, but is usually 50 mol % or more, preferably 70 mol % or more, preferably 90 mol % or more from the viewpoint of heat resistance.

Examples of the styrene-based elastomer (N) include a styrene-isoprene-styrene block copolymer (SIS), a styrene-butadiene-styrene block copolymer (SBS), a styrene-ethylene-butene block copolymer (SEB), a styrene-ethylene-propylene block copolymer (SEP), a styrene-ethylene-butene-styrene block copolymer (SEBS), a styrene-ethylene-propylene-styrene copolymer block (SEPS), a styrene-ethylene-ethylene-propylene-styrene block copolymer (SEEPS), and a styrene-vinyl(ethylene-propylene)-styrene copolymer (V-SEPS). Among them, from the viewpoint of improving compatibility between the ethylene-acrylic acid alkyl ester copolymer (L) and a thermoplastic resin (X), a styrene-ethylene-butene-styrene block copolymer (SEBS), a styrene-ethylene-propylene-styrene block copolymer (SEPS), and a styrene-ethylene-ethylene-propylene-styrene block copolymer (SEEPS) are preferred.

The ethylene-acrylic acid alkyl ester copolymer (L) content of the resin composition is preferably 20 to 75 wt %, more preferably 25 wt % or more and 70 wt % or less from the viewpoint of improving compatibility with the graft copolymer (M).

The graft copolymer (M) content of the resin composition is preferably 0.5 to 20 wt %, more preferably 1 wt % or more and 15 wt % or less from the viewpoint of improving the silent properties (effect of suppressing squeaking noises) of a resin molded body.

The styrene-based elastomer (N) content of the resin composition is preferably 20 to 70 wt %, more preferably 25 wt % or more and 65 wt % or less from the viewpoint of improving the dispersibility of the graft copolymer (M).

A thermoplastic composition according to the present invention can be obtained by melt kneading the ethylene-acrylic acid alkyl ester copolymer (L), the graft copolymer (M), and the styrene-based elastomer (N). The melt kneading of the precursor may be performed by, for example, a method using a kneading machine such as a Banbury mixer, a kneader, a kneading extruder, a twin-screw extruder, or a roll. The number of times of kneading may be either once or two or more times. The time of kneading depends on, for example, the size of a kneading machine to be used, but may usually be about 3 to 10 minutes. The discharge temperature of the kneading machine is preferably 130 to 350° C., more preferably 150 to 250° C.

A thermoplastic resin composition according to the present invention contains the above-described resin composition and a thermoplastic resin (X).

<Thermoplastic Resin (X)>

The thermoplastic resin (X) is at least one selected from among a polycarbonate (PC) resin and a resin containing, as structural units, a rubber-based polymer, a vinyl cyanide-based monomer, and an aromatic vinyl-based monomer.

As the polycarbonate (PC) resin, an aromatic polycarbonate resin may be used which is produced by a reaction between a dihydric phenol and a carbonate precursor (a phosgene method or an ester exchange method). The dihydric phenols as a raw material may be used singly or in combination of two or more of them, and the carbonate precursors as a raw material may be used singly or in combination of two or more of them.

Examples of the dihydric phenol include: 4,4'-dihydroxy-diphenyl; bis(4-hydroxyphenyl)alkanes such as 1,1-bis(4-hydroxyphenyl)methane, 1,1-bis(4-hydroxyphenyl)ethane, and 2,2-bis(4-hydroxyphenyl)propane [bisphenol A}; bis(4-hydroxyphenyl)cycloalkanes; bis(4-hydroxyphenyl)oxides; bis(4-hydroxyphenyl)sulfides; bis(4-hydroxyphenyl)sulfones, bis(4-hydroxyphenyl)sulfoxides; and bis(4-hydroxyphenyl)ketones. Among them, bisphenol A is preferred. Examples of the carbonate precursor include carbonyl halides, haloformates, and carbonic acid esters. Specific examples of the carbonate precursor include phosgene, dihaloformates of dihydric phenol, diphenyl carbonate, dimethyl carbonate, and diethyl carbonate. The PC (polycarbonate) resin may be a branched polycarbonate resin obtained using a polyfunctional aromatic compound and a dihydric phenol in combination, and its terminal OH group may be blocked.

An example of a commercially-available product of the PC (polycarbonate) resin includes "TARFLON A2200" (standard grade) manufactured by Idemitsu Kosan Co., Ltd.

The resin containing, as structural units, a rubber-based polymer, a vinyl cyanide-based monomer, and an aromatic vinyl-based monomer is obtained by, for example, a method in which a monomer component containing the vinyl cyanide-based monomer, the aromatic vinyl-based monomer, and another optional copolymerizable monomer added if necessary is subjected to graft polymerization in the presence of the rubber-based polymer. Examples of a method used for the polymerization include well-known methods such as bulk polymerization, solution polymerization, suspension polymerization, and emulsion polymerization.

Examples of the rubber-based polymer include a diene-based rubber, an acrylic rubber, and an ethylene-propylene-based rubber. Examples of the diene-based rubber include a polybutadiene rubber, an acrylonitrile-butadiene copolymer rubber, a styrene-butadiene copolymer rubber, and a polyisoprene rubber. Examples of the acrylic rubber include: acrylic rubbers containing, as a structural unit, an α,β-unsaturated carboxylic acid such as acrylic acid or methacrylic acid; and acrylic rubbers containing, as a structural unit, an α,β-unsaturated carboxylic acid ester such as methyl methacrylate, ethyl methacrylate, t-butyl methacrylate, or cyclohexyl methacrylate. Examples of the ethylene-propylene-based rubber include EPR and EPDM. These rubber-based polymers may be used singly or in combination of two or more of them.

Examples of the vinyl cyanide monomer include acrylonitrile and methacrylonitrile. Among them, acrylonitrile is preferred. These vinyl cyanide monomers may be used singly or in combination of two or more of them.

Examples of the aromatic vinyl monomer include styrene, α-methyl styrene, o-methyl styrene, m-methyl styrene, p-methyl styrene, and p-t-butyl styrene. Among them, styrene and α-methyl styrene are preferred. These aromatic vinyl monomers may be used singly or in combination of two or more of them.

Examples of the other copolymerizable monomer include: α,β-unsaturated carboxylic acids such as acrylic acid and methacrylic acid; α,β-unsaturated carboxylic acid esters such as methyl methacrylate, ethyl methacrylate, t-butyl methacrylate, and cyclohexyl methacrylate; imide compounds of an α,β-unsaturated dicarboxylic acid such as maleic anhydride and itaconic anhydride. These other copolymerizable monomers may be used singly or in combination of two or more of them.

Examples of the resin containing, as structural units, a rubber-based polymer, a vinyl cyanide-based monomer, and an aromatic vinyl-based monomer include an ABS resin, an ASA resin, and an AES resin.

Examples of the ABS-based resin include an acrylonitrile-butadiene-styrene copolymer, an acrylonitrile-butadiene-styrene-α-methyl styrene copolymer, and an acrylonitrile-butadiene-styrene-N-phenylmaleimide copolymer. Examples of a commercially-available product of the ABS-based resin include "Stylac 321" manufactured by Asahi Kasei Chemicals Corporation and "TOYOLAC 700-314" manufactured by Toray Industries, Inc.

Examples of the ASA-based resin include acrylonitrile-styrene-acrylate copolymers. An example of a commercially-available product of the ASA-based resin includes "UNIBRITE UA1300" manufactured by NIPPON A&L INC.

When the thermoplastic resin (X) is a mixed resin of the resin containing, as structural units, a rubber-based polymer, a vinyl cyanide-based monomer, and an aromatic vinyl-based monomer and the polycarbonate (PC) resin, the PC resin content of the mixed resin is preferably 50 to 95 wt %, more preferably 55 to 90 wt % from the viewpoint of improving mechanical properties and impact resistance.

An example of a commercially-available product of a mixed resin of the PC resin and the ABS resin (PC/ABS resin) includes "Bayblend T65XF" manufactured by Bayer.

The amount of the resin composition is preferably 1 to 25 parts by weight per 100 parts by weight of the thermoplastic resin (X). From the viewpoint of improving the silent properties (effect of suppressing squeaking noises) of a resin molded body, the amount of the resin composition is more preferably 2 parts by weight or more, even more preferably 5 parts by weight or more and is more preferably 20 parts by weight or less, even more preferably 18 parts by weight or less per 100 parts by weight of the thermoplastic resin (X).

It is to be noted that the thermoplastic resin composition according to the present invention may use various compounding agents. Examples of the compounding agents include: fibrous reinforcing materials such as ceramic fibers (CF), glass fibers, aramid fibers, potassium titanate fibers, crushed mineral fibers, silica fibers, alumina fibers, plaster fibers, magnesium hydroxide fibers, silicon carbide fibers, and zirconia fibers; various shape organic or inorganic fillers such as spherical silica, mica, wollastonite, calcium carbonate, kaolin, clay, bentonite, sericite, glass beads, glass flakes, alumina, calcium silicate, magnesium carbonate, talc, zinc oxide, titanium oxide, iron oxide, graphite, carbon black, molybdenum disulfide, and ultra-high-density polyethylene; lubricants such as mineral oils, hydrocarbons, fatty acids, fatty acid esters, fatty acid amides, alcohols, metallic soaps, natural waxes, and silicone; PTFE-based processing aids and acrylic processing aids; inorganic flame retardants such as magnesium hydroxide and aluminum hydroxide; organic flame retardants such as halogen-based flame retardants and phosphorus-based flame retardants; engineering plastics such as polyacetals, polyamides, and polyphenylene ethers; and antioxidants, UV protective agents, light stabilizers, coloring agents, antistatic agents, crosslinking agents, dispersing agents, coupling agents, foaming agents, and coloring agents.

The thermoplastic resin composition according to the present invention can be obtained by mixing the resin composition, the thermoplastic resin (X), and the various compounding agents added if necessary. A method used for the mixing is not particularly limited, and an example thereof includes a melt-kneading method using a kneading machine such as a Banbury mixer, a kneader, a kneading extruder, a twin-screw extruder, or a roll. The above-described components may be added in any order during kneading or may be added at a time before kneading. The number of times of kneading may be either once or two or more times. The time of kneading depends on, for example, the size of a kneading machine to be used, but may usually be about 3 to 10 minutes. The discharge (extrusion) temperature of the kneading machine is preferably 150 to 350° C., more preferably 180 to 250° C.

A thermoplastic resin molded body according to the present invention is obtained by molding the above-described thermoplastic resin composition into a predetermined shape. A molding method is not particularly limited, and examples thereof include injection molding and extrusion molding. The heating temperature for molding, the pressure and time of molding, etc. can appropriately be set. The thermoplastic resin molded body is excellent in silent properties (effect of suppressing squeaking noises) at a time when a resin member and leather rub against each other, and therefore can be used in a wide range of fields such as mechanical parts and automobile parts (e.g., seat members and console boxes including resin members that may come into contact with artificial leather (soft vinyl chloride) or natural leather).

EXAMPLES

Hereinbelow, the present invention will be described in more detail with reference to examples.

Examples

<Production of graft copolymer (M)>

Production Example 1-1

First, 2500 g of pure water was placed in a stainless steel autoclave having an internal volume of 5 L, and 2.5 g of polyvinyl alcohol was further dissolved therein as a suspension agent. Then, 800 g of an ethylene-ethyl acrylate copolymer (A1) (manufactured by Japan Polyethylene Corporation under the product name of "REXPEARL A3100") was placed therein as an ethylene-acrylic acid alkyl ester copolymer (A) and dispersed by stirring.

Further, a solution was prepared by dissolving 5.1 g of di(3,5,5-trimethylhexanoyl)peroxide (manufactured by NOF CORPORATION under the product name of "PER-OYL 355", 10-hr half-life temperature=59° C.) as a polymerization initiator and 17.2 g of t-butyl peroxymethacryloyloxyethyl carbonate (C) (hereinafter also referred to as MEC) in a monomer component (B) containing 240 g of butyl acrylate (hereinafter also referred to as BA) and 103 g of methyl methacrylate (hereinafter also referred to as MMA), and this solution was placed in the autoclave, and the resulting mixture was stirred.

Then, the temperature of the autoclave was increased to 60 to 65° C., and the mixture was stirred for 3 hours to impregnate the ethylene-acrylic acid alkyl ester copolymer (A) with the radical polymerization initiator, the t-butyl peroxymethacryloyloxyethyl carbonate (C), and the monomer component (B). Then, the temperature of the autoclave was increased to 80 to 85° C., and the autoclave was kept at this temperature for 7 hours to perform polymerization to obtain a precursor (an ethylene-ethyl acrylate copolymer composition impregnated with a poly(BA/MMA/MEC) copolymer). The obtained precursor was melt kneaded at 230° C. using a LABO PLASTOMILL single-screw extruder (manufactured by Toyo Seiki Seisaku-sho, Ltd.) to perform a grafting reaction. Then, a strand-shaped resin composition was obtained and then cut into pellets to produce a graft copolymer (M) of Production Example 1-1.

Production Examples 1-2 to 1-7, Comparative Production Examples 1-1 to 1-3

In each of Production Examples and Comparative Production Examples, a graft copolymer (M) was produced in the same manner as in Example 1-1 except that the type and amount of each of the raw materials added were changed as shown in Table 1. It is to be noted that in Comparative Example 1-3, the ethylene-acrylic acid alkyl ester copolymer (A) was directly used without using the graft copolymer (M).

TABLE 1

| | Graft copolymer (M) | | | | | | | | |
|---|---|---|---|---|---|---|---|---|---|
| | Ethylene-acrylic acid alkyl ester copolymer (A) | | Monomer component (B) | | | | | | |
| | | | (b-1) BA | (b-2) MMA | (b-3) St | (b-4) AN | (b-5) HPMA | MEC (C) | |
| | Type | parts by weight | parts by weight | parts by weight | parts by weight | parts by weight | parts by weight | parts by weight | Polymerization initiator Type |
| Production Example 1-1 | A1 | 70 | 21 | 9 | | | | 1.5 | R355 |
| Production Example 1-2 | A2 | 70 | | | 21 | 9 | | 1 | BW |
| Production Example 1-3 | A2 | 70 | 15 | 15 | | | | 1 | BW |
| Production Example 1-4 | A3 | 70 | | | 24 | 6 | | 0.5 | R355 |
| Production Example 1-5 | A4 | 60 | 28 | 12 | | | | 2 | R355 |
| Production Example 1-6 | A2 | 80 | | | 14 | 6 | | 1.5 | R355 |
| Production Example 1-7 | A3 | 70 | 10 | | 10 | | 10 | 1 | R355 |
| Comparative Production Example 1-1 | A2 | 40 | 42 | 18 | | | | 1.5 | BW |
| Comparative Production Example 1-2 | PE | 70 | | | 21 | 9 | | 1 | R355 |
| Comparative Production Example 1-3 | A3 | 100 | | | | | | | |

In Table 1,

A1 represents an ethylene-ethyl acrylate copolymer (manufactured by Japan Polyethylene Corporation under the product name of "REXPEARL A3100", Ratio of structural unit derived from ethyl acrylate: 10 wt %, MFR: 3 (g/10 min));

A2 represents an ethylene-ethyl acrylate copolymer (manufactured by Japan Polyethylene Corporation under the product name of "REXPEARL A4200", Ratio of structural unit derived from ethyl acrylate: 20 wt %, MFR: 5 (g/10 min));

A3 represents an ethylene-ethyl acrylate copolymer (manufactured by Japan Polyethylene Corporation under the product name of "REXPEARL A4250", Ratio of structural unit derived from ethyl acrylate: 25 wt %, MFR: 5 (g/10 min));

A4 represents an ethylene-ethyl acrylate copolymer (manufactured by NUC Corporation under the product name of "NUC-6940", Ratio of structural unit derived from ethyl acrylate: 35 wt %, MFR: 20 (g/10 min));

PE represents low-density polyethylene (manufactured by SUMITOMO CHEMICAL COMPANY, LIMITED under the product name of "Sumikasen G401", MFR: 4 (g/10 min));

BA represents butyl acrylate;

MMA represents methyl methacrylate;

St represents styrene;

AN represents acrylonitrile;

HPMA represents 2-hydroxypropyl methacrylate;

R355 represents di(3,5,5-trimethylhexanoyl) peroxide (manufactured by NOF CORPORATION under the product name of "PEROYL 355", 10-hr half-life temperature=59° C.); and BW represents benzoyl peroxide (manufactured by NOF CORPORATION under the product name of "NYPER BW", 10-hr half-life temperature=74° C.)

<Production of Resin Composition>

Example 1-1

First, 60 g of an ethylene-ethyl acrylate copolymer (L1) (manufactured by Japan Polyethylene Corporation under the product name of "REXPEARL A3100") as an ethylene-acrylic acid alkyl ester copolymer (L), 10 g of the graft copolymer (M) of Example 1-1, 30 g of a styrene-ethylene-butylene-styrene (SEBS) block copolymer (manufactured by Kraton Polymer under the product name of "Kraton G1652") as a styrene-based elastomer (N), and 0.5 g of pentaerythritol tetrastearate as a lubricant were dry blended. Then, the resulting mixture was melt kneaded (extrusion temperature: 140 to 160° C.) using a twin-screw extruder (PCM-30 manufactured by Ikegai Corp). Then, a strand-shaped resin composition was obtained and then cut into pellets to obtain a resin composition of Example 1-1.

Examples 1-2 to 1-8, Comparative Examples 1-1 to 1-5

In each of Examples and Comparative Examples, a resin composition was produced in the same manner as in Example 1-1 except that the type and amount of each of the raw materials added were changed as shown in Table 2. It is to be noted that as the graft copolymer (M) of Comparative Production Example 1-3, the ethylene-acrylic acid alkyl ester copolymer (A) was directly used.

<Production of Thermoplastic Resin Composition>

Example 2-1

First, 100 g of a PC/ABS resin (manufactured by Bayer under the product name of "Bayblend T65XF") as a thermoplastic resin (X) and 10 g of the resin composition obtained above in Example 1-1 as a resin composition component were melt kneaded (extrusion temperature: 230 to 250° C.) using a twin-screw extruder (PCM-30 manufactured by Ikegai Corp). Then, a strand-shaped thermoplastic resin composition was obtained and then cut to obtain pellets of the thermoplastic resin composition.

The thermoplastic resin composition obtained above was used to evaluate silent properties (effect of suppressing squeaking noises) in the following manner. The results are shown in Tables 3 and 4.

<Evaluation of Silent Properties (Effect of Suppressing Squeaking Noises)>

The pellets obtained above were subjected to injection molding (barrel temperature: 240 to 250° C., mold temperature: 80° C.) to prepare a specimen for evaluation (length: 60 mm×width: 100 mm×thickness: 2 mm). Then, the specimen (material to be evaluated) was cut to obtain a plate for the test of silent properties (55 mm×80 mm×2 mm), and burrs were removed from the plate. Then, the plate was left to stand at a temperature of 25° C. and a humidity of 50% RH for 12 hours. As a counterpart material, polyvinyl chloride (PVC) leather ("PVC knit fabric, width 1250 mm, All Mighty, cut fabric" manufactured by SINCOL Co, Ltd.) was used.

The evaluation of silent properties was performed in the following manner. The plate for the test of silent properties and the polyvinyl chloride (PVC) leather as a counterpart material were fixed to a stick slip test stand SSP-04 manufactured by Ziegler, and the plate and the counterpart material were rubbed against each other under conditions of a load of 40 N and a speed of 1 mm/s to measure the risk value of squeaking noises. It is to be noted that when the risk value of squeaking noises is lower, the risk of generating squeaking noises is lower. Evaluation criteria for the risk value of squeaking noises are as follows.

Risk value of squeaking noises 1 to 3: The risk of generating squeaking noises is low.

Risk value of squeaking noises 4 to 5; The risk of generating squeaking noises is slightly high.

Risk value of squeaking noises 6 to 10: The risk of generating squeaking noises is high.

When the risk value of squeaking noises of the thermoplastic resin molded body according to the present invention was 3 or less in the above evaluation of silent properties, the thermoplastic resin molded body was regarded as excellent in silent properties.

Examples 2-2 to 2-12, Comparative Examples 2-1 to 2-8

<Production of Thermoplastic Resin Composition>

In each of Examples and Comparative Examples, a thermoplastic resin composition was produced in the same manner as in Example 2-1 except that the type and amount of each of the raw materials added were changed as shown in Tables 3 and 4. It is to be noted that in Comparative Examples 2-7 to 2-11, the thermoplastic resin (X) was directly used.

The thermoplastic resin compositions of Examples 2-2 to 2-12 and Comparative Examples 2-1 to 2-11 obtained above were used to evaluate silent properties (effect of suppressing squeaking noises) by the evaluation method described above. The results are shown in Tables 3 and 4.

TABLE 2

| | Resin composition | | | | | |
|---|---|---|---|---|---|---|
| | Ethylene-acrylic acid alkyl ester copolymer (L) | | Graft copolymer (M) | | Styrene-based elastomer (N) | |
| | Type | parts by weight | Type | parts by weight | Type | parts by weight |
| Example 1-1 | L1 | 60 | Production Example 1-1 | 10 | N1 | 30 |
| Example 1-2 | L2 | 45 | Production Example 1-2 | 10 | N2 | 45 |
| Example 1-3 | L2 | 45 | Production Example 1-3 | 10 | N3 | 45 |
| Example 1-4 | L3 | 45 | Production Example 1-4 | 5 | N3 | 50 |
| Example 1-5 | L4 | 35 | Production Example 1-5 | 5 | N3 | 60 |
| Example 1-6 | L2 | 35 | Production Example 1-3 | 5 | N2 | 60 |
| Example 1-7 | L3 | 30 | Production Example 1-6 | 10 | N4 | 60 |
| Example 1-8 | L3 | 35 | Production Example 1-7 | 5 | N2 | 60 |
| Comparative Example 1-1 | L2 | 60 | Comparative Production Example 1-1 | 15 | N1 | 25 |
| Comparative Example 1-2 | L2 | 60 | Comparative Production Example 1-2 | 15 | N1 | 25 |
| Comparative Example 1-3 | L2 | 60 | Comparative Production Example 1-3 | 15 | N2 | 25 |
| Comparative Example 1-4 | L3 | 100 | | | | |
| Comparative Example 1-5 | L3 | 85 | Production Example 1-1 | 15 | | |

TABLE 3

| | Thermoplastic resin (X) | | Resin composition | | Silent properties (Effect of suppressing squeaking noises) |
|---|---|---|---|---|---|
| | Type | parts by weight | Type | parts by weight | Against PVC leather |
| Example 2-1 | PC/ABS | 100 | Example 1-1 | 10 | 2 |
| Example 2-2 | PC | 100 | Example 1-2 | 10 | 1 |
| Example 2-3 | ABS | 100 | Example 1-3 | 10 | 3 |
| Example 2-4 | ASA | 100 | Example 1-4 | 10 | 2 |
| Example 2-5 | PC/ASA | 100 | Example 1-5 | 10 | 1 |
| Example 2-6 | ABS | 100 | Example 1-6 | 10 | 2 |
| Example 2-7 | ABS | 100 | Example 1-7 | 10 | 3 |
| Example 2-8 | PC/ABS | 100 | Example 1-8 | 10 | 2 |
| Example 2-9 | PC/ABS | 100 | Example 1-2 | 10 | 3 |
| Example 2-10 | PC/ABS | 100 | Example 1-5 | 10 | 2 |
| Example 2-11 | PC/ABS | 100 | Example 1-6 | 10 | 2 |
| Example 2-12 | PC/ABS | 100 | Example 1-8 | 5 | 2 |
| Target value | | | | | 3 or less |

TABLE 4

| | Thermoplastic resin (X) | | Resin composition | | Silent properties (Effect of suppressing squeaking noises) |
|---|---|---|---|---|---|
| | Type | parts by weight | Type | parts by weight | Against PVC leather |
| Comparative Example 2-1 | PC/ABS | 100 | Comparative Example 1-1 | 10 | 6 |
| Comparative Example 2-2 | PC/ABS | 100 | Comparative Example 1-2 | 10 | 8 |
| Comparative Example 2-3 | ABS | 100 | Comparative Example 1-3 | 10 | 9 |
| Comparative Example 2-4 | ABS | 100 | Comparative Example 1-4 | 10 | 8 |

TABLE 4-continued

|  | Thermoplastic resin (X) | | Resin composition | | Silent properties (Effect of suppressing squeaking noises) |
| --- | --- | --- | --- | --- | --- |
|  | Type | parts by weight | Type | parts by weight | Against PVC leather |
| Comparative Example 2-5 | PC/ABS | 100 | Comparative Example 1-5 | 10 | 8 |
| Comparative Example 2-6 | PC/ABS | 100 | Y1 | 10 | 7 |
| Comparative Example 2-7 | PC/ABS | 100 |  |  | 9 |
| Comparative Example 2-8 | PC | 100 |  |  | 5 |
| Comparative Example 2-9 | ABS | 100 |  |  | 9 |
| Comparative Example 2-10 | ASA | 100 |  |  | 8 |
| Comparative Example 2-11 | PC/ASA | 100 |  |  | 6 |
|  | Target value |  |  |  | 3 or less |

In Table 2,

L1 represents an ethylene-ethyl acrylate copolymer (manufactured by Japan Polyethylene Corporation under the product name of "REXPEARL A3100", Ratio of structural unit derived from ethyl acrylate: 10 wt %, MFR: 3 (g/10 min));

L2 represents an ethylene-ethyl acrylate copolymer (manufactured by Japan Polyethylene Corporation under the product name of "REXPEARL A4200", Ratio of structural unit derived from ethyl acrylate: 20 wt %, MFR: 5 (g/10 min));

L3 represents an ethylene-ethyl acrylate copolymer (manufactured by Japan Polyethylene Corporation under the product name of "REXPEARL A4250", Ratio of structural unit derived from ethyl acrylate: 25 wt %, MFR: 5 (g/10 min));

L4 represents an ethylene-ethyl acrylate copolymer (manufactured by NUC Corporation under the product name of "NUC-6940", Ratio of structural unit derived from ethyl acrylate: 35 wt %, MFR: 20 (g/10 min));

N1 represents a styrene-ethylene-butylene-styrene (SEBS) block copolymer (manufactured by Kraton Polymer under the product name of "Kraton G1652");

N2 represents a styrene-ethylene-propylene-styrene (SEPS) block copolymer (manufactured by Kuraray Co, Ltd. under the product name of "SEPTON 2006");

N3 represents a styrene-ethylene-ethylene-propylene-styrene (SEEPS) block copolymer (manufactured by Kuraray Co, Ltd. under the product name of "SEPTON 4045"); and N4 represents a styrene-ethylene-propylene (SEP) block copolymer (manufactured by Kuraray Co, Ltd. under the product name of "SEPTON 1001").

In Tables 3 and 4,

PC/ABS represents a PC/ABS resin (manufactured by Bayer under the product name of "Bayblend T65XF");

PC represents a polycarbonate (manufactured by Idemitsu Kosan Co, Ltd. under the product name of "TARFLON A2200");

ABS represents an acrylonitrile-butadiene-styrene copolymer (manufactured by Asahi Kasei Chemicals Corporation under the product name of "Stylac 321");

ASA represents an acrylonitrile-styrene-acrylate copolymer (manufactured by NIPPON A&L INC. under the product name of "UNIBRITE UA1300");

PC/ASA represents a PC/ASA resin (mixture of PC (polycarbonate) "TARFLON A2200" manufactured by Idemitsu Kosan Co, Ltd. and ASA (acrylonitrile-styrene-acrylate copolymer) manufactured by NIPPON A&L INC. under the product name of "UNIBRITE UA1300", Mixing ratio (PC/ASA)=70/30); and Y1 represents an olefin-based graft copolymer (corresponding to Production Example 1-7 in Table 1 of JP-A-2017-14447).

When the thermoplastic resin compositions of Examples 2-1 to 2-12 were used, evaluation results satisfying the target value of silent properties (effect of suppressing squeaking noises) were obtained.

In the case of Comparative Example 2-1 using the resin composition containing the graft copolymer (M) having a weight ratio between the ethylene-acrylic acid alkyl ester copolymer (A) and the monomer component (B) ((A)/(B)) of 40/60, the risk value of squeaking noise generation was 6 and thus did not satisfy the target value.

In the case of Comparative Example 2-2 using the resin composition containing the graft copolymer (M) using low-density polyethylene instead of the ethylene-acrylic acid alkyl ester copolymer (A), the risk value of squeaking noise generation was 8 and thus did not satisfy the target value.

In the case of Comparative Example 2-3 using the resin composition using the ethylene-acrylic acid alkyl ester copolymer (A) directly without using the graft copolymer (M), the risk value of squeaking noise generation was 9 and thus did not satisfy the target value.

In the case of Comparative Example 2-4 using the resin composition not containing the graft copolymer (M) and the styrene-based elastomer (N), the risk value of squeaking noise generation was 8 and thus did not satisfy the target value.

In the case of Comparative Example 2-5 using the resin composition not containing the styrene-based elastomer (N), the risk value of squeaking noise generation was 8 and thus did not satisfy the target value.

In the case of Comparative Example 2-6 using the olefin-based graft copolymer (Y1) as the resin composition, the risk value of squeaking noise generation was 7 and thus did not satisfy the target value.

In the cases of Comparative Examples 2-7 to 2-11 using the thermoplastic resin (X) directly, the risk value of squeaking noise generation was high and did not satisfy the target value.

Hereinbelow, preferred formulation examples of the thermoplastic resin composition according to the present invention (formulation examples using the above-described various compounding agents) will be described.

TABLE 5

<Formulation Example 1>

| | |
|---|---|
| PC/ABS | 100 parts by weight |
| ethylene-ethyl acrylate copolymer (corresponding to ethylene-acrylic acid alkyl ester copolymer (A)) | 0.50 parts by weight |
| butyl acrylate | 0.16 parts by weight |
| methyl methacrylate | 0.068 parts by weight |
| t-butyl peroxymethacryloyloxyethyl carbonate | 0.011 parts by weight |
| di(3,5,5-trimethylhexanoyl)peroxide | 0.0034 parts by weight |
| ethylene-ethyl acrylate copolymer (corresponding to ethylene-acrylic acid alkyl ester copolymer (L)) | 3.0 parts by weight |
| styrene-ethylene-butylene-styrene block copolymer | 1.3 parts by weight |
| pentaerythritol tetrastearate | 0.015 parts by weight |
| stearyl-β-(3,5-di-tert-butyl-4-hydroxyphenyl)propionate] | 0.10 parts by weight |
| tris(2,4-di-tert-butylphenyl)phosphite | 0.10 parts by weight |
| bisphenol A bisdiphenyl phosphate | 0.10 parts by weight |

TABLE 6

<Formulation Example 2>

| | |
|---|---|
| ABS | 100 parts by weight |
| ethylene-ethyl acrylate copolymer (corresponding to ethylene-acrylic acid alkyl ester copolymer (A)) | 0.50 parts by weight |
| butyl acrylate | 0.16 parts by weight |
| methyl methacrylate | 0.068 parts by weight |
| t-butyl peroxymethacryloyloxyethyl carbonate | 0.011 parts by weight |
| di(3,5,5-trimethylhexanoyl)peroxide | 0.0034 parts by weight |
| ethylene-ethyl acrylate copolymer (corresponding to ethylene-acrylic acid alkyl ester copolymer (L)) | 3.0 parts by weight |
| styrene-ethylene-ethylene-propylene-styrene block copolymer | 1.3 parts by weight |
| ethylene bisstearylamide | 0.5 parts by weight |
| pentaerythritol tetrakis[3-(3,5-di-tert-butyl-4-hydroxyphenyl)propionate] | 0.15 parts by weight |
| bis(2,4-di-tert-butylphenyl)pentaerythritol diphosphite | 0.25 parts by weight |

TABLE 7

<Formulation Example 3>

| | |
|---|---|
| ABS | 100 parts by weight |
| ethylene-ethyl acrylate copolymer (corresponding to ethylene-acrylic acid alkyl ester copolymer (A)) | 0.50 parts by weight |
| butyl acrylate | 0.16 parts by weight |
| methyl methacrylate | 0.068 parts by weight |
| t-butyl peroxymethacryloyloxyethyl carbonate | 0.011 parts by weight |
| di(3,5,5-trimethylhexanoyl)peroxide | 0.0034 parts by weight |
| ethylene-ethyl acrylate copolymer (corresponding to ethylene-acrylic acid alkyl ester copolymer (L)) | 3.0 parts by weight |
| styrene-ethylene-propylene-styrene block copolymer | 1.3 parts by weight |
| magnesium stearate | 0.4 parts by weight |
| pentaerythritol tetrakis[3-(3,5-di-tert-butyl-4-hydroxyphenyl)propionate] | 0.15 parts by weight |
| bis(2,4-di-tert-butylphenyl)pentaerythritol diphosphite | 0.25 parts by weight |
| ADK STAB LA-63P | 0.3 parts by weight |

TABLE 8

<Formulation Example 4>

| | |
|---|---|
| PC | 100 parts by weight |
| ethylene-ethyl acrylate copolymer (corresponding to ethylene-acrylic acid alkyl ester copolymer (A)) | 0.50 parts by weight |
| butyl acrylate | 0.16 parts by weight |
| methyl methacrylate | 0.068 parts by weight |
| t-butyl peroxymethacryloyloxyethyl carbonate | 0.011 parts by weight |
| di(3,5,5-trimethylhexanoyl)peroxide | 0.0034 parts by weight |
| ethylene-ethyl acrylate copolymer (corresponding to ethylene-acrylic acid alkyl ester copolymer (L)) | 3.0 parts by weight |
| styrene-ethylene-propylene-styrene block copolymer | 1.3 parts by weight |
| behenyl behenate | 0.4 parts by weight |
| bis(2,6-di-tert-butyl-4-methylphenyl)pentaerythritol diphosphite | 0.15 parts by weight |
| tris(2,4-di-tert-butylphenyl)phosphite | 0.25 parts by weight |

TABLE 9

<Formulation Example 5>

| | |
|---|---|
| PC/ASA | 100 parts by weight |
| ethylene-ethyl acrylate copolymer (corresponding to ethylene-acrylic acid alkyl ester copolymer (A)) | 0.50 parts by weight |
| butyl acrylate | 0.16 parts by weight |
| methyl methacrylate | 0.068 parts by weight |
| t-butyl peroxymethacryloyloxyethyl carbonate | 0.011 parts by weight |
| di(3,5,5-trimethylhexanoyl)peroxide | 0.0034 parts by weight |
| ethylene-ethyl acrylate copolymer (corresponding to ethylene-acrylic acid alkyl ester copolymer (L)) | 3.0 parts by weight |
| styrene-ethylene-propylene-styrene block copolymer | 1.3 parts by weight |
| behenyl behenate | 0.4 parts by weight |
| bisphenol A bisdiphenyl phosphate | 0.10 parts by weight |
| PELECTRON HS | 3.0 parts by weight |

In Tables 5 to 9,

PC/ABS represents a PC/ABS resin (manufactured by Bayer under the product name of "Bayblend T65XF");

ABS represents an acrylonitrile-butadiene-styrene copolymer (manufactured by Asahi Kasei Chemicals Corporation under the product name of "Stylac 321");

ethylene-ethyl acrylate copolymer (corresponding to the ethylene-acrylic acid alkyl ester copolymer (A)) represents an ethylene-ethyl acrylate copolymer (manufactured by Japan Polyethylene Corporation under the product name of "REXPEARL A4200", Ratio of structural unit derived from ethyl acrylate: 20 wt %, MFR: 5 (g/10 min));

ethylene-ethyl acrylate copolymer (corresponding to the ethylene-acrylic acid alkyl ester copolymer (L)) represents an ethylene-ethyl acrylate copolymer (manufactured by Japan Polyethylene Corporation under the product name of "REXPEARL A4200", Ratio of structural unit derived from ethyl acrylate: 20 wt %, MFR: 5 (g/10 min));

styrene-ethylene-butylene-styrene block copolymer represents a styrene-ethylene-butylene-styrene (SEBS) block copolymer (manufactured by Kraton Polymer under the product name of "Kraton G1652");

styrene-ethylene-ethylene-propylene-styrene block copolymer represents a styrene-ethylene-ethylene-propylene-styrene (SEEPS) block copolymer (manufactured by Kuraray Co, Ltd. under the product name of "SEPTON 4033");

styrene-ethylene-propylene-styrene block copolymer represents a styrene-ethylene-propylene-styrene (SEPS) block copolymer (manufactured by Kuraray Co, Ltd. under the product name of "SEPTON 2006");

ADK STAB LA-63P represents a hindered amine-based light stabilizer (manufactured by ADEKA Corporation under the product name of "ADK STAB LA-63P"); and PELECTRON HS represents an antistatic agent (manufactured by Sanyo Chemical Industries, Ltd. under the product name of "PELECTRON HS").

All the thermoplastic resin compositions obtained according to Formulation Examples 1 to 5 were excellent in silent properties (effect of suppressing squeaking noises).

The invention claimed is:

1. A resin composition comprising an ethylene-acrylic acid alkyl ester copolymer (L), a graft copolymer (M), and a styrene-based elastomer (N), wherein
the graft copolymer (M) is obtained by a reaction among an ethylene-acrylic acid alkyl ester copolymer (A), a monomer component (B) containing at last one monomer selected from the group consisting of a (meth) acrylic acid alkyl ester monomer and an aromatic vinyl monomer, and t-butyl peroxymethacryloyloxyethyl carbonate (C), and
a weight ratio between the ethylene-acrylic acid alkyl ester copolymer (A) and the monomer component (B) ((A)/(B)) is 50/50 to 98/2;
wherein a content of the ethylene-acrylic acid alkyl ester copolymer (L) is 20 to 75 wt %, a content of the graft copolymer (M) is 0.5 to 20 wt %, and a content of the styrene-based elastomer (N) is 20 to 70 wt %.

2. The resin composition according to claim 1, wherein the monomer component (B) further contains at least one monomer selected from the group consisting of a (meth) acrylonitrile monomer and a (meth)acrylic acid hydroxyalkyl ester monomer.

3. The resin composition according to claim 1, wherein the styrene-based elastomer (N) is a block copolymer containing a polymer block including polystyrene and a polymer block including a conjugated diene compound.

4. A thermoplastic resin composition comprising the resin composition according to claim 1 and a thermoplastic resin (X), wherein
the thermoplastic resin (X) is at least one selected from the group consisting of a polycarbonate resin and a resin containing, as structural units, a rubber-based polymer, a vinyl cyanide-based monomer, and an aromatic vinyl-based monomer.

5. The thermoplastic resin composition according to claim 4, wherein an amount of the resin composition is 1 to 25 parts by weight per 100 parts by weight of the thermoplastic resin (X).

6. A thermoplastic resin molded body obtained from the thermoplastic resin composition according to claim 4.

* * * * *